US008732588B2

(12) United States Patent
Klawitter et al.

(10) Patent No.: US 8,732,588 B2
(45) Date of Patent: May 20, 2014

(54) METHOD AND APPARATUS FOR REMOTELY DISPLAYING SCREEN FILES AND EFFICIENTLY HANDLING REMOTE OPERATOR INPUT

(75) Inventors: Paul T. Klawitter, Frankfort, IL (US); Robert S. Gallagher, New Lenox, IL (US)

(73) Assignee: Applied Systems, Inc., University Park, IL (US)

( * ) Notice: Subject to any disclaimer, the term of this patent is extended or adjusted under 35 U.S.C. 154(b) by 811 days.

(21) Appl. No.: 12/207,448

(22) Filed: Sep. 9, 2008

(65) Prior Publication Data

US 2010/0064230 A1    Mar. 11, 2010

(51) Int. Cl.
*G06F 3/00*    (2006.01)

(52) U.S. Cl.
USPC ......................................................... 715/748

(58) Field of Classification Search
USPC ......................................................... 715/748
See application file for complete search history.

(56) References Cited

U.S. PATENT DOCUMENTS

| 5,581,703 | A * | 12/1996 | Baugher et al. | 709/225 |
|---|---|---|---|---|
| 5,838,910 | A * | 11/1998 | Domenikos et al. | 709/203 |
| 5,928,323 | A * | 7/1999 | Gosling et al. | 709/203 |
| 6,393,569 | B1 * | 5/2002 | Orenshteyn | 726/4 |
| 7,200,651 | B1 * | 4/2007 | Niemi | 709/223 |
| 2002/0174010 | A1 * | 11/2002 | Rice, III | 705/14 |
| 2003/0208356 | A1 * | 11/2003 | King et al. | 704/270 |
| 2005/0246642 | A1 * | 11/2005 | Valderas et al. | 715/730 |
| 2006/0179121 | A1 | 8/2006 | Kegoya | |
| 2007/0226613 | A1 * | 9/2007 | Tandriono et al. | 715/530 |
| 2008/0052124 | A1 * | 2/2008 | Goodman et al. | 705/3 |
| 2008/0059331 | A1 * | 3/2008 | Schwab | 705/27 |

OTHER PUBLICATIONS

Steinmetz et al., "Multimedia Fundamentals, vol. 1: Media Coding and Content Processing, Second Edition", Jan. 16, 2002, Prentice Hall, 2nd ed., p. 166.*
Web Browser Applications; Citrix, Terminal Services, and Remote Desktop applications; Traditional Desktop applications.
Model-View-Controller, Java BluePrints—J2EE Patterns.
Model-View-Controller, MSDN, Microsoft.
Introduction to Windows Presentation Foundation, Windows Presentation Foundation, MSDN, Microsoft.
XAML Overview, Windows Presentation Foundation, MSDN, Microsoft.
Routed Events Overview, Windows Presentation Foundation, MSDN, Microsoft.
Rich Internet application, Wikipedia, 2008.

(Continued)

*Primary Examiner* — Boris Pesin
*Assistant Examiner* — Matthew Ell
(74) *Attorney, Agent, or Firm* — K&L Gates LLP (57) ABSTRACT

A system and method for remotely displaying screen files and for trapping a customized set of operator input is disclosed. A server generates and deploys a plurality of screen files to a remote client. The screen files each include a plurality of display control elements and a list of events to be trapped and forwarded to the server. The list of events may be optimized for each particular screen file. The remote client displays the plurality of display control elements and stores the list of events. For any event that occurs which is included in the list of events, such as a submit data event, the remote client sends data indicative of the event to the server. The server interprets the data indicative of the occurrence of the event, processes the event, and, if appropriate, generates and sends a command to update the displayed representation of the screen file.

31 Claims, 4 Drawing Sheets

(56) References Cited

OTHER PUBLICATIONS

Rich Internet application, Wikipedia, 2009.
Web 2.0, Wikipedia, 2008.
Web 2.0, Wikipedia, 2009.
International Search Report mailed Oct. 26, 2009 and International Preliminary Report on Patentability mailed Mar. 24, 2011 for International Application No. PCT/US2009/056371.

* cited by examiner

METHOD AND APPARATUS FOR REMOTELY DISPLAYING SCREEN FILES AND EFFICIENTLY HANDLING REMOTE OPERATOR INPUT

CROSS-REFERENCE TO RELATED APPLICATIONS

This application is related to the following co-pending commonly-owned patent applications: U.S. application Ser. No. 12/207,425 filed Sep. 9, 2008, entitled "METHODS AND APPARATUS FOR DELIVERING DOCUMENTS," currently pending; U.S. application Ser. No. 12/207,449 filed Sep. 9, 2008, entitled "METHOD, SYSTEM, AND APPARATUS FOR SCANNING AND IMPORTING DOCUMENTS," currently pending; U.S. application Ser. No. 12/207,442 filed Sep. 9, 2008, entitled "METHOD AND APPARATUS FOR DISPLAYING A MENU FOR ACCESSING HIERARCHICAL CONTENT DATA INCLUDING CACHING MULTIPLE MENU STATES," currently pending; and U.S. application Ser. No. 12/207,436 filed Sep. 9, 2008, entitled "METHOD AND APPARATUS FOR REMOTELY DISPLAYING A LIST BY DETERMINING A QUANTITY OF DATA TO SEND BASED ON THE LIST SIZE AND THE DISPLAY CONTROL SIZE," currently pending; and U.S. application Ser. No. 12/207,454 filed Sep. 9, 2008, entitled "METHOD, SYSTEM, AND APPARATUS FOR SECURE DATA EDITING," currently pending, the entire contents of each of which is incorporated by reference herein.

TECHNICAL FIELD

The present system relates in general to application servers, and more specially to a system for deploying and remotely displaying a plurality of screen files and for efficiently handling remote operator input based on the screen files.

BACKGROUND

Certain known software, when executed on a server, enables the server to send data including display information over a network to a remote client machine for display to a remote operator. For example, certain software enables a processor to function as a web server by sending hypertext markup language (HTML) files stored on a storage device of the server to a plurality of remote clients for viewing. Such web server software typically requires the remote client to install additional software, known as browser software, to interpret and correctly display the information contained within the HTML files. This browser software does not typically correspond with particular server software—rather, the browser software is configured to interpret any HTML file generated and served by any web server.

Certain server software is configured to send files other than HTML files for display on a remote client. For example, certain software enables servers to send interactive files such as common gateway interface (CGI) files or scripting language (e.g., JAVASCRIPT) files for execution on or by the remote client. By sending CGI or scripting language (e.g., JAVASCRIPT) files, this server software can enable more robust interaction between the operator at the remote client and the server, such as by displaying real-time data from a database without creating an HTML file or enabling the operator at the remote client to remotely modify a database stored on the server.

Even though certain server software enables more robust interaction between the remote operator and the server, the CGI or scripting language (e.g., JAVASCRIPT) files sent by such software pose a number of problems in many client/server environments. In industries such as the insurance industry, such CGI or scripting language (e.g., JAVASCRIPT) files can enable the robust interaction with a remote database which is not facilitated by flat HTML files. However, such files typically require additional software installed on the remote client (or more robust browser software) which includes an interpreter for interpreting the code sent over the network. Thus, the hardware requirements of the remote client are more demanding. Moreover, if a server operator desires to send data representing visually complex data such as interactive, tiered menu data, CGI and scripting language (e.g., JAVASCRIPT) files to adequately display such data are especially complex. Since a CGI or a scripting language (e.g., JAVASCRIPT) file may rely on the browser (and hence the processor of the remote client) to do a relatively large percentage of the processing necessary to adequately display these complex menu systems, remote clients with outdated or insufficient hardware capabilities can have difficulty displaying the desired data. Particularly in an industry wherein an individual insurance agent may not have the technological wherewithal to maintain an appropriately capable hardware setup, enabling interaction with data stored at the server using CGI or scripting language (e.g., JAVASCRIPT) files can prove to be an unworkable solution.

Even though certain server software enables more robust interaction between the remote operator and the server, the CGI or JavaScript files sent by such software pose a number of problems in many client/server environments. In industries such as the insurance industry, such CGI or JavaScript files can enable the robust interaction with a remote database which is not facilitated by flat HTML files. However, such files typically require additional software installed on the remote client (or more robust browser software) which includes an interpreter for interpreting the code sent over the network. Thus, the hardware requirements of the remote client are more demanding. Moreover, if a server operator desires to send data representing visually complex data such as interactive, tiered menu data, CGI and JavaScript files to adequately display such data are especially complex. Since a CGI or a JavaScript file may rely on the browser (and hence the processor of the remote client) to do a relatively large percentage of the processing necessary to adequately display these complex menu systems, remote clients with outdated or insufficient hardware capabilities can have difficulty displaying the desired data. Particularly in an industry wherein an individual insurance agent may not have the technological wherewithal to maintain an appropriately capable hardware setup, enabling interaction with data stored at the server using CGI or JavaScript files can prove to be an unworkable solution.

Another drawback associated with sending executable files such as CGI or scripting language (e.g., JAVASCRIPT) files for remote display is that such files are not secure from interception and malicious use. Rather, such files have very predictable, non-proprietary header structures. Even if the file is sent as a binary file, Interception of such an unknown binary file enables a malicious operator to easily determine that the binary file is an executable file, execute the file, and gain access to the server using the functionality enabled by the intercepted file. Particularly in industries such as the insurance industry, data to which server operators desire to provide access can very sensitive, such as data personal identification information (i.e., Social Security Numbers, drivers license numbers), health information (i.e., results of medical testing for a life insurance company), and other sensitive information. Thus, standard, known executable files interpretable by standard browser software may provide an unworkable solution.

Another drawback associated with sending executable files such as CGI or JavaScript files for remote display is that such files are not secure from interception and malicious use. Rather, such files have very predictable, non-proprietary header structures. Even if the file is sent as a binary file, Interception of such an unknown binary file enables a malicious operator to easily determine that the binary file is an executable file, execute the file, and gain access to the server using the functionality enabled by the intercepted file. Particularly in industries such as the insurance industry, data to which server operators desire to provide access can very sensitive, such as data personal identification information (i.e., Social Security Numbers, drivers license numbers), health information (i.e., results of medical testing for a life insurance company), and other sensitive information. Thus, standard, known executable files interpretable by standard browser software may provide an unworkable solution.

Finally, certain known server software is not configured to elegantly handle events which occur at and are trapped by the remote client. Current computer systems generate thousands of events, most of the events being invisible to the operator, during standard use of the system. For example, current computer systems may generate input events such as mouse down, mouse up, mouse over, mouse out, double click, button press, and button release events. The quantity of events generated by an operator simply browsing displayed data that sending data representative of each event to a server can strain even broadband internet or network connections. Moreover, certain known software is configured to statically handle a set of events regardless of the data being sent from the server to the remote client. Thus, while certain interaction may require robust event handling (i.e., dynamically browsing a menu-intensive web page with links to a plurality of database items, which benefits from handling a plurality of mouse, keyboard, and/or other input device events), other interaction requires substantially less robust event handling (i.e., enabling a user to login, which can be sufficiently implemented by handling only keystroke events). Known software does not enable customization of the handling of events—rather, an all-or-nothing approach is typically taken, wherein either data representative of any event trapped at the remote client is sent to the server, or no data is sent to the server regardless of the type of event which is trapped. Each option is problematic: sending data representative of all trapped events can be extraordinarily burdensome for even a broadband network connection, and sending no data representative of trapped events severely limits the functionality enabled by the server. The lack of customizability of such functionality can be particularly cumbersome and harmful in the insurance industries, wherein as discussed above, functionality is frequently sacrificed due to inadequate hardware at remote clients and inadequate network connectivity.

SUMMARY

The system disclosed herein overcomes the described deficiencies of the prior art by providing a server for deploying a plurality of relatively small screen files to a remote client for display to an operator, wherein the remote client enables the operator to manipulate data stored on the server by providing input at the remote client. Screen files stored on the server may include display information such as a plurality of display control elements which represent an operator interface to application software running on the server. The screen files also include a list of events to be trapped and sent to the server during display of the display information on the remote client, such as a list of events which mandate server action. For example, a screen file which displays a radio button may include an event in the list of trappable events corresponding to a selection of the radio button. The screen files are preferably stored as a plurality of relatively small serialized binary files for deployment to a plurality of remote clients, each of which is running minimal client software for executing the screen files.

The server deploys the screen file to the remote client. The client software interprets the deployed binary representation of the screen file and populates a display control executed by the client based on the display information. The populated display control enables an operator to interact with the plurality of display control elements of the screen file as if the operator is locally accessing application software stored on the server. While displaying a deployed screen file (and enabling operator interaction therewith), the remote client handles a plurality of events such as input events generated by the operator. For example, the remote client may handle a radio-button selected event. If a trapped event is one of the events of the list of events contained in the deployed screen file, the remote client may sends data indicative of the trapped event to the server. The server may interpret the data indicative of the trapped event, modify any data stored on the server, and generate a command for sending in response to the trapped event. For example, the server may generate a command which causes a previously hidden data entry field, stored in the screen file as a display control element, to be revealed to the operator. The server preferably sends the command to the remote client, the display control of which interprets the command and appropriately alters the displayed screen file, such as by displaying the previously hidden data entry field.

It should be appreciated that the disclosed system enables screen files containing a customizable list of relevant events to be deployed such that upon an occurrence of one of the stored relevant events, data indicative of those relevant events is trapped and sent to the server for handling. This enables unimportant events (in the context of a particular screen file) to be handled but not trapped. Thus, the disclosed system enables efficient remote display of a plurality of display control elements regardless of connection speed and remote client hardware capability, while preserving a robust server-side event handling functionality.

Additional features and advantages are described herein, and will be apparent from the following Detailed Description and the figures.

DETAILED DESCRIPTION

The screen file deployment and display system disclosed herein preferably enables a server administrator to provide remote operators at remote clients or terminals with robust software functionality without relying on the hardware capabilities of the remote clients or terminals to perform the substantive data processing associated with such functionality. Moreover, the screen file deployment and display system disclosed herein enables the server administrator to provide such remote access in real-time regardless of the quality or speed of the network connection between the remote client or terminal and the server while providing an interface which appears to the remote operator to be running locally on the remote client or terminal.

The disclosed system may be configured to provide remote operator access to application software running on a server. For example, insurance information management software, which provides access to a vast database of insurance information may be implemented to run on a server. To be practically usable, such software may enable remote operators to access the server and operate the software as if the remote operator were sitting at a display device connected to the server. The disclosed system facilitates such remote access by deploying a plurality of screen files which replicate the interface of the application software running on the server, and which enable the operator to interact with the screen files as if the operator were interacting directly with the application software. The disclosed system preferably enables an operator to access the application software regardless of the hardware specifications of a remote client and regardless of an internet connection speed, as discussed below.

It should be appreciated that the disclosed screen file deployment and display system is not limited to use with a particular type of application software. Rather, the disclosed system can be adapted for use with any type of application software for which remote access is desirable. For example, the disclosed system may be utilized to provide remote access to educational software running on a server, database software running on a server, financial software running on a server, entertainment software running on a server, or any other software running on a server. By deploying a plurality of screen files which replicate the user interface of server-side software at a remote location, the disclosed system thus provides an efficient mechanism for interfacing a plurality of remote operators at relatively unsophisticated remote clients with a sophisticated, powerful server which performs the bulk of the processing required by the application software.

Figure 1:
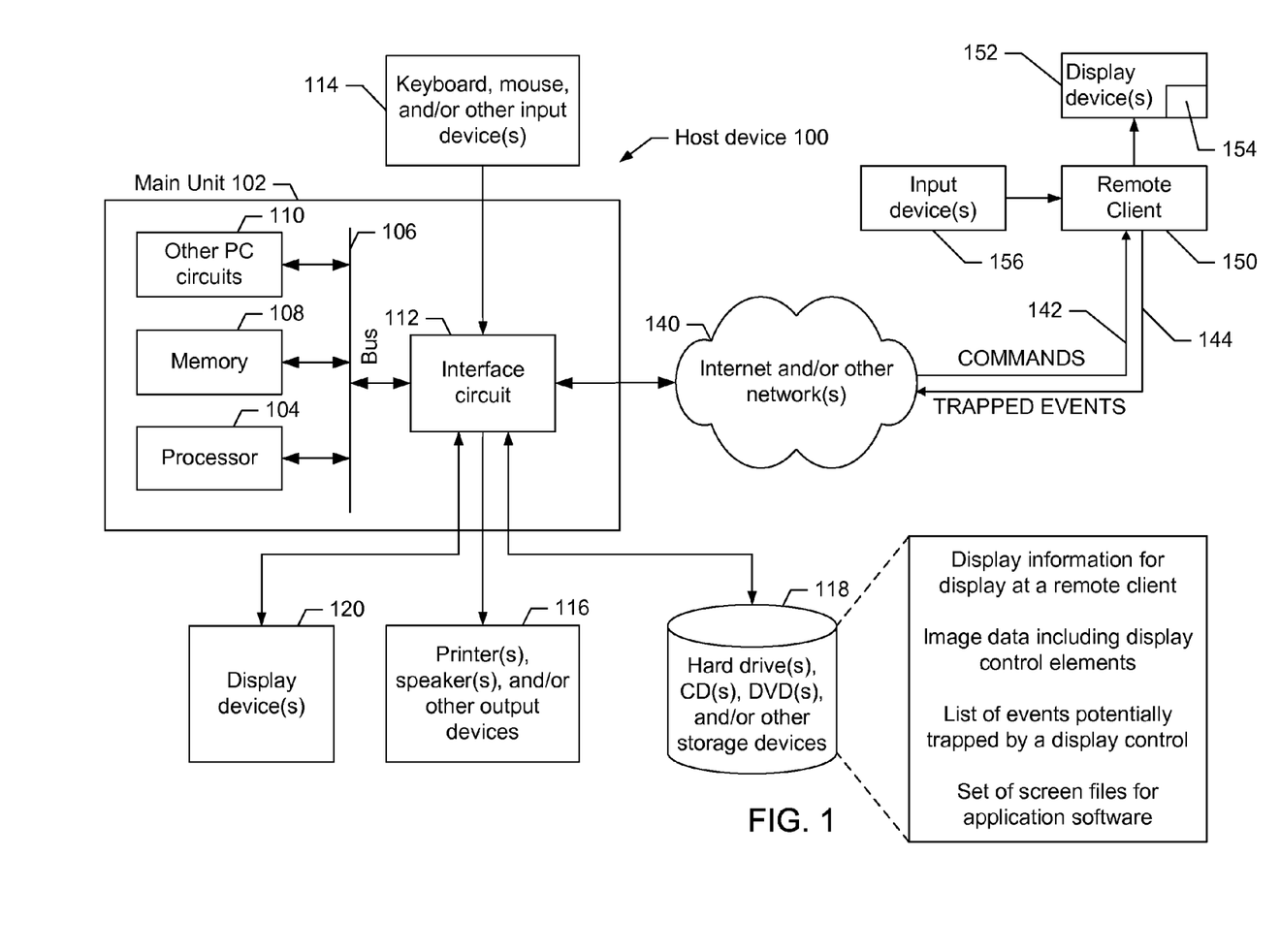
FIG. 1 is a block diagram of an example system architecture for implementing the remote screen file deployment and display system disclosed herein.

FIG. 1 is a block diagram of an example system architecture for implementing the remote screen file deployment and display system disclosed herein. Specifically, FIG. 1 illustrates a schematic block diagram of a server (e.g., host device 100) for implementing the remote screen file display system disclosed herein. In the example architecture, the host device 100 includes a main unit 102 which preferably includes one or more processors 104 electrically coupled by an address/data bus 106 to one or more memory devices 108, other computer circuitry 110, and one or more interface circuits 112. The processor 104 may be any suitable processor. The memory 108 preferably includes a combination of volatile memory and non-volatile memory.

Preferably, the memory 108 stores a software program that causes the host device 100 to operate as a server for deploying a plurality of screen files to other devices of the system such as remote clients 150, as described below. This software program may be executed by the processor 104 in any suitable manner. The memory 108 may also store digital data indicative of documents, files, programs, web pages, trapped events etc. retrieved or received from a remote client 150, such as data received from the remote client indicative of one or more trapped events which is included in a set of events associated with a screen file. The processor 104 may additionally be configured to receive data indicative of trapped events at the remote client 150 and to generate one or more commands for sending to the remote client 150 in response to the trapped event.

The commands generated by the server for sending to the remote client may be any suitable messages which, when received by the remote client 150, cause the remote client to alter at least one of the plurality of display control elements according to the data contained in the command. For example, a command may be an event generated by the server and sent to the remote client for handling by the display control. Alternatively or additionally, a command may be a message having a proprietary format which is sent to the remote client and routed to the display control for handling. The server may store a plurality of commands as predefined commands and may send one or more predefined command in response to receiving at least one trapped event from the remote client. Alternatively, the server may be configured to generate a command for sending to the remote client based on the data contained within the trapped event from the remote client and/or based on application software executed by the server. It should be appreciated that a command may alternatively be any other suitable stream of data sendable from the server to the client.

The interface circuit 112 may be implemented using any suitable interface standard, such as an Ethernet interface and/or a Universal Serial Bus (USB) interface. One or more input devices 114 may be connected to the interface circuit 112 for entering data and commands into the main unit 102. For example, the input device 114 may be a keyboard, mouse, touch screen, track pad, track ball, isopoint, and/or a voice recognition system.

One or more displays 120 or printers, speakers, and/or other output devices 116 may also be connected to the main unit 102 via the interface circuit 112. The display 120 may be a cathode ray tube (CRT), liquid crystal display (LCD), or any other type of display. The display 120 may generate visual displays of screen shots and/or digital displays of sets of events which are relevant to the screen shots. The visual displays may include prompts for human input, run time statistics, calculated values, data, etc. For example, the display 120 may be used to enable a server administrator to monitor the functionality of the host device 100 and to ensure that the host device 100 remains in signal communication with the remote client 150. Alternatively, the display 120 may be used to display screen files created for displaying data stored by the host device 100 prior to deploying such screen files to the remote client. Still alternatively, the display 120 may enable a server administrator to generate, modify, and/or view commands prior to sending those commands to the remote client 150 in response to a trapped event.

One or more storage devices 118 may also be connected to the main unit 102 via the interface circuit 112. For example, a hard drive, CD drive, DVD drive, and/or other storage devices may be connected to the main unit 102. The storage devices 118 may store any type of data used by the host device 100 and/or any type of data for sending to a remote client 150.

In one example described in more detail below, the storage device 118 stores data which is provided to a remote client via a set of deployed screen files. Such data may include content data, database records, commands, and any other appropriate data for deployment to a plurality of remote clients such as remote client 150. It should be appreciated that if the disclosed host device 100 is implemented to provide access to insurance data, the data may include insurance policy information, claim information, and personal information about purchasers of insurance.

Preferably, the storage device 118 stores a set of screen files which represents a full set of screen files needed for deployment to provide remote access to the application software of the server. By storing the set of screen files, the storage device may thus store image data in the form of a plurality of display control elements which can be selectively sent to a remote client and handled by a display control of the remote client. The plurality of display control elements may include, among other display control elements, menu display control elements, button display control elements, list data control elements, secure and non-secure data entry display control elements, and any other appropriate display control elements. The storage device 118 also preferably stores a list of events which can be handled by the remote client, the events enabling an operator to interact with the display control elements to utilize the application software running on the server.

The host device 100 may exchange data, such as by deploying data representing screen files and receiving data indicative of trapped events, with at least one remote client such as remote client 150 using a connection to network 140. The network connection may be any suitable network connection, such as an Ethernet connection, a digital subscriber line (DSL), a telephone line, a coaxial cable, etc. Access to a host device 100 may be controlled by appropriate security software or security measures. An individual operator's access can be defined by the host device 100 and limited to certain data and/or actions. Accordingly, operators of the system interacting with a remote client 150 may be required to register with one or more host devices 100.

The system disclosed herein may be configured to minimize the quantity of data sent to and received from the remote client 150. Thus, the remote client 150 may communicate with the host device 100 by way of the internet and/or other network 140 using a data download portion 142 of a network connection and a data upload portion 144 of the network connection. The data download portion 142 and the data upload portion 144 may be provided using a same physical device or connection such as a wire.

As indicated in FIG. 1, the host device 100, operating as a screen file server of the disclosed screen file display system, may send a plurality of commands over the data download portion 142 of the connection, and may receive a plurality of trapped events indicating operator input over the data upload portion 144 of the connection, as described in detail below. The disclosed host device 100 may also send the plurality of initially-deployed screen files to the remote client 150 via the data download portion 142. The plurality of screen files which deployed over the data download portion 142 may be deployed relatively infrequently when compared with receiving the plurality of trapped events via the data upload portion 144. For example, the disclosed system may deploy a plurality of screen files to a remote client 150 based on the remote client's anticipated functionality. This deployment may occur once, such that additional large sets of data may not need to occur. Alternatively, additional screen files may be deployed to a remote client 150 based on an outdated screen file, a changed functionality of the remote client 150, a screen file which the remote client determines is corrupted or otherwise modified, or any other suitable event which requires additional screen files to be sent.

The remote client 150 may include at least one display device 152 for displaying a plurality of screen files and/or other data sent from the host device 100 to the remote client 150. For example, the display device may be a monitor such as a cathode ray tube (CRT) monitor, a liquid crystal display (LCD) monitor, or any other suitable display device.

As illustrated, the display device 152 may be configured to display a display control 154, implemented by appropriate client-side software running on the remote client 150. The display control 154 may be configured to determine an appropriate display configuration for a plurality of display control elements contained in a received screen file. For example, the remote client 150 may receive a display control element instructing the display control 154 to display a hierarchical menu containing data as sent either within the screen file or as a separate data file from the host device 100. The display control may determine any appropriate hierarchical relationships of the menu items and may appropriately display the display control element.

Alternatively, the display control may receive a plurality of display control elements which each represent a separate menu item such as a menu item including the text "Auto Insurance Policies." The display control 154 may interpret this data and may display an aesthetically pleasing menu item including the appropriate text, such as a three dimensional menu item having a designated color in a designated position in the display control. In this embodiment, the screen file may display a plurality of display controls such that the relationship among and between the display control elements creates a hierarchical menu structure.

It should be appreciated that the display control 154 may be solely responsible for determining the displayed layout of the plurality of display control elements in much the same way as standard web browser software is responsible for interpreting HTML files and displaying the files within a web browser window. Alternatively, the data sent by the host device 100 may include an indication of at least some aesthetic characteristic of a display control element, such as an indication of a color, font, size, or other appropriate characteristic. Still alternatively, the display control may contain sufficient logic to determine how to display a display control element of a relatively high-level type, such as a "virtual list" display control element, using data contained either within the screen file or using data sent as a separate file from the host device 100.

The remote client 150 may also include at least one input device 156 such as a mouse, keyboard, touch screen, or other appropriate input device. The input device 156 may enable an operator at the remote client 150 to generate events which are handled by the remote client 150 as described below.

Depending on the contents of a screen file sent to the remote client 150, an event generated by an operator at the remote client 150 may be trapped by the remote client 150 and sent via the data upload portion 144 of the network connection to the host device 100. It should be appreciated that the remote client 150 may be configured to execute a display control, which interprets the display control elements of a received screen file and enables an operator to interact with the screen file. It should be further appreciated that the remote client 150 may perform little or no processing beyond determining how to display a screen file and trapping events defined by a screen file and sending the trapped events to the host device 100. Thus, the remote client 150 may function as a terminal for displaying screen files and for handling appropriate events input by an operator at the remote terminal 150. Moreover, the remote client 150 may enable the operator to interact directly with the application software running on the host device 100 by trapping a set of relevant events and sending data representative of those events to the host device 100 and by receiving commands from the host device 100 indicating appropriate responses to the trapped events as generated by the server.

Figure 2A:
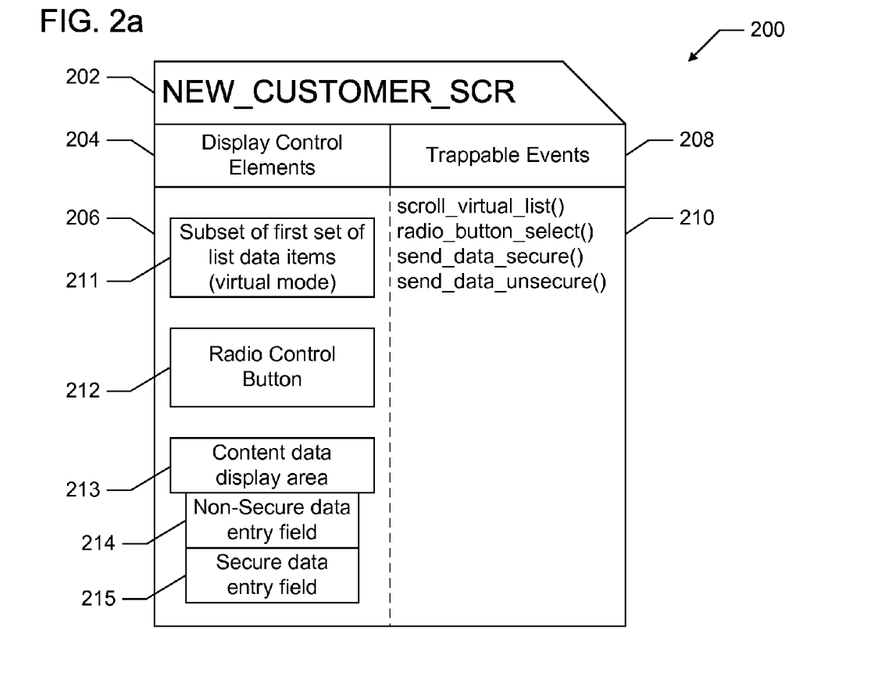
FIG. 2a is a schematic representation of the contents of a screen file as disclosed herein.

FIG. 2a is a schematic representation of the contents of a screen file utilized by the screen file display system disclosed herein. Specifically, FIG. 2a illustrates an example screen file 200. The system disclosed herein may be configured to automatically generate screen files such as screen file 200 to remotely display a user interface of application software running on the host device 100, thus enabling an operator at the remote client 150 to utilize the application software remotely. For example, the disclosed system may generate a screen file for displaying an application software login screen, an application software data access screen, and/or an application software logout screen.

Screen files such as screen file 200 may be created by an application developer in conjunction with the development of the code executable on the server. For example, if an application developer wishes to enable an operator to browse a list of data items and to view content data associated with the list of data items, the application developer may create a screen file to provide such an interface when executed as discussed below. Thus, a single application runnable on the server may provide remote access to operators at remote devices 150 by deploying a plurality of screen files to the remote clients 150 for storage and execution. It should be appreciated that screen files are preferably generated and deployed to a remote client 150 based on an anticipated usage of the application software by the remote client 150.

The illustrated screen file 200 includes a screen file title 202. The title of the illustrated screen file is NEW_CUSTOMER_SCR, which indicates that the file is a screen file created to display a plurality of control elements which enable an operator to enter data about a new customer. Thus, upon deployment of screen file 200 to the remote client 150, the display control may execute the screen file 200 and display a plurality of data entry fields an d a "submit" or "save" button. Alternative screen files may include titles 202 which refer to a particular application software represented by the screen file 200, or which are not human readable or understandable—for example, the screen file title 202 may be a numeral indicating an order of creation of the screen file. Certain screen files may not include titles, or may include titles having sub-titles to more accurately describe the purpose of the screen file.

The example screen file 200 is preferably divided into at least two sections including at least a display control elements section 204 and a trappable events section 208.

The display control elements section 204 of the example screen file 200 may contain data representing a plurality of display control elements which are interpretable by a display control implemented by software running at a remote client 150. Specifically, screen file 200 includes display control elements 206 representing various items displayable by the display control. Among these are a list of data items, displayed in virtual mode 211, a radio control button 212, and a content data display area 213 having a non-secure data entry field 214 (i.e., a field in which the data characters are not masked or hidden) and a secure data entry field 215 (i.e., a field in which the entered characters are masked or hidden as they are typed). It should be appreciated that the list data items of the list control element 211 may be may be displayed in virtual mode or non-virtual mode, with the display control making such a determination depending on the size of the display control and the quantity of items in the lists. The display control elements 206 may be stored as appropriate representations of display control elements, such as tagged or untagged ASCII text, binary data, hexadecimal data, or any other suitable proprietary or non-proprietary format.

It should be appreciated that the display control elements contained in the screen file 200 may represent a minimum amount of data usable by the remote client 150 to populate a display control and to enable an operator to browse the data displayed in the display control as if the operator were accessing application software locally. That is, the illustrated display control elements 206 may be data representative of a plurality of elements which, when displayed simultaneously, provide an operator with robust access to application software. Because the display control files are preferably initially deployed and thereafter updated infrequently (i.e., until and unless the version data is uploaded, as described below), the disclosed system may rely on the remote client 150 to interpret the data representing the plurality of display control elements, display the display control elements in an appropriate display control, and enable an operator to interact with the display control elements appropriately. It should be appreciated that by not sending image data such as bitmap data including representations of a plurality of colors of a plurality of pixels, the screen files generated by the disclosed system are small in size and still provide sufficient data to ensure accurate display by the remote client 150 and to ensure that the remote client enables an operator to access the server software in an appropriate way.

The display control elements 206 of the screen file 200 may also be modified based on commands received from the host device 100 acting as a server. For example, one or more of the display control elements 206 may be hidden display control elements. Based on a trapped event sent to the server, the server may generate a command as disclosed below which causes the hidden display control element 206 to be displayed. For example, an operator may select a first radio button, which may represent a trapped event sent to the server. Based on a received command from the server, the remote client 150 may display a previously hidden second radio button. It should be appreciated that such an interaction may appear to the operator that the selecting of the first radio button caused the second radio button to appear.

The display control elements 206 stored by the screen file are not limited to data for displaying a list in either virtual or non-virtual mode and/or for displaying data entry fields. For example, the display control elements 204 of the screen file 200 may additionally or alternatively include raw data stored in a database maintained on storage device 118 of the host device 100, such that sending the screen file 200 enables the operator at the remote client to browse and manipulate the data of the database. The display control elements may display a plurality of menus, a plurality of data entry fields, a plurality of buttons for generating reports, a plurality of windows for displaying data stored in a remote database, or data representative of any other suitable component of a software application. The display control elements may include data indicating a relative position in the display control, a relative size of the display control element, or any other data needed to accurately recreate an interface of a software application at a remote client.

It should be appreciated that the display control elements may include a minimal set of data sufficient to enable display of each of the components in an interface displayed by application software. Thus, when the disclosed remote client executes a display control and displays a plurality of display control elements of a deployed screen file, the plurality of display control elements, it can do so using a relatively small screen file, such as a screen file which is preferably less than twenty kilobytes in size and more preferably less than ten kilobytes in size, such as being one kilobyte in size.

The screen file 200 also includes a trappable events section 208. The trappable events section 208 of the illustrated screen file 200 includes a representation of at least one trappable event 210 associated with the display control elements 206 of the screen file 200. Specifically, the example screen file 200 includes four trappable events which, when trapped, enable an operator to remotely browse the menu items stored in the screen file 200. For example, the illustrated screen file 200 may enable the operator to scroll through a virtually displayed list (scroll_virtual_list( )), select the radio button control (radio_button_control( )) and/or send data either securely or unsecurely (send_data_secure( ) and send_data_unsecure( )).

It should be appreciated that the trappable events 210 stored for a particular screen file may be based on a set of hardware capabilities of a particular destination remote client 150 for the screen file 200. For example, the screen file 200 may contain more trappable events 210 for a remote client 150 which is connected to the host device 100 via a broadband connection than for a remote client 150 which is connected via a dial-up connection, as sending data indicative of each trapped event represents a lesser burden on the hardware.

It should further be appreciated that the trappable events section 208 may include any suitable event, such as events defined by an operating system running on the remote client 150, events defined by an operating system running on the host device 100, or customized events not natively trapped by any operating system. If events which cannot be natively handled by the remote client are stored in the screen file 200 (i.e., a right-click event for a remote client 150 whose native operating system does not recognize or utilize a right mouse button), the screen file may include additional instructions executable by the remote client 150 indicating how to recognize and trap the non-native event. Thus, the disclosed system enables robust event handling, wherein even non-native events can be handled by a remote client 150 based on the contents of the screen file 200.

The disclosed system may enable an operator to generate events which impact the interface displayed by the display control but which are not trapped events which are sent back to the server for handling. For example, a display control may display a list of data items and may enable an operator to manipulate a mouse to move a cursor displayed by the remote client 150. The display control may determine when the mouse cursor is positioned over one of the list items, and when the mouse cursor is so positioned, may highlight or otherwise indicate that the mouse cursor is positioned over the list control item. However, despite handling the mouse-over event locally, the screen file which causes the list of items to be displayed may not include data in the trappable event section 208 which indicate that mouse-over events should be trapped and sent to the server. Thus, despite an alteration of the display control element within the display control, the remote client may not send events that it handles but which do not impact the state of data stored on the server. It should be appreciated that by minimizing the quantity of events which are handled during operator interaction with the display control at the remote client 150, the disclosed system minimizes the network traffic generated by such remote access to the application software of the server.

It should be appreciated that by enabling a list of trappable events to be stored on a screen file by screen file basis, the disclosed system enables the traffic sent and received over a network connection to be minimized. That is, for each displayed screen file, the disclosed system is configured to send only a minimal set of trapped events (if they occur) to the server for further processing. Whereas known systems store events at the display control level, such that every time a certain type of event occurs it is trapped and sent to the server, the disclosed system enables an application developer to specify a plurality of events applicable for certain of the screen files but not all of the screen files. Moreover, because the screen shots are implemented as a plurality of display control elements, a remote client need not have any knowledge of the purpose of the screen shot within the context of the application software—rather, the remote client merely displays the plurality of display control elements and handles any events as appropriate.

Figure 2B:
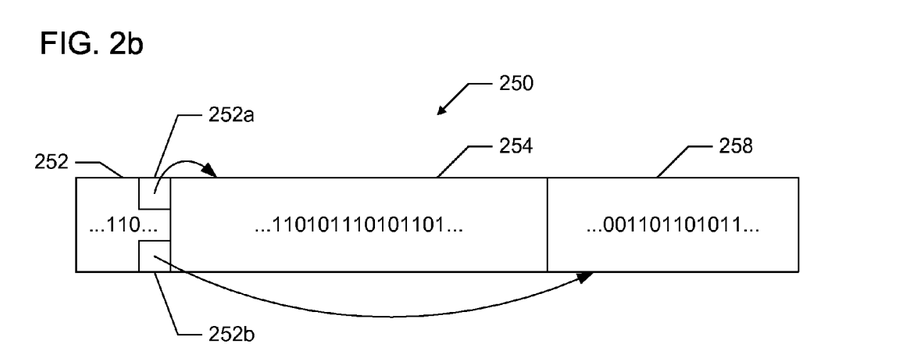
FIG. 2b is an example illustration a serialized binary version of a screen file as disclosed herein.

FIG. 2b is an example illustration a serialized binary version of a screen file as disclosed herein. Upon creation of a screen file such as screen file 200, the disclosed system may store the screen file in a serialized binary format 250. This format enables the host device 100 to easily send a single, relatively small binary file 250 to the remote client 150 for handling. The single binary file 250 preferably includes the display control elements and the set of trappable events needed by the display control executed by the remote client 150 to populate the display control and handle operator input. In the example serialized binary version of the screen file 250, the file includes a relatively small header portion 252, and relatively larger display control elements section 254 and trappable events selection 258.

The header portion 252 preferably includes binary data indicating that the file 250 is a serialized binary version of a screen file, thus enabling the remote client 150 to appropriately interpret and handle the file 250. The header portion 252 may include indicators 252a and 252b which indicate beginning points within the serialized binary screen file 250 of the display control elements section 254 and the trappable events section 258, respectively. For example, indicators 252a and 252b may be binary representations of a relative position within the binary file 250.

The display control elements section 254 may include a binary representation of the plurality of display control elements 206, which are preferably understandable and displayable by the display control 154 of the remote client 150. The trappable events section 258 may include a binary representation of the plurality of trappable events 210 to enable the remote client 150 to trap the appropriate events and forward data indicating the trapped events to the host device 100. It should be appreciated that any suitable representation (i.e., other than a serialized binary representation) of a screen file 200 which is understandable by the remote client 150 is contemplated by this disclosure. It should be further appreciated that the representation of the screen file 200 is preferably stored in a secure, proprietary format such that any illicit interception of the representation of the screen file 200 is not easily usable to access the host device 100.

The remote client 150 may include client-side software running natively on the remote client 150 which determines (such as using a checksum) whether a received screen file has been tampered with, altered, or may be otherwise compromised. If the remote client determines that such tampering or alteration may have occurred, the remote client 150 may send a message to the server alerting it of the alteration. The server may log such an event and may send a replacement screen file to the remote client 150, thus ensuring that the remote client executes only current, non-compromised screen files.

Figure 3A:
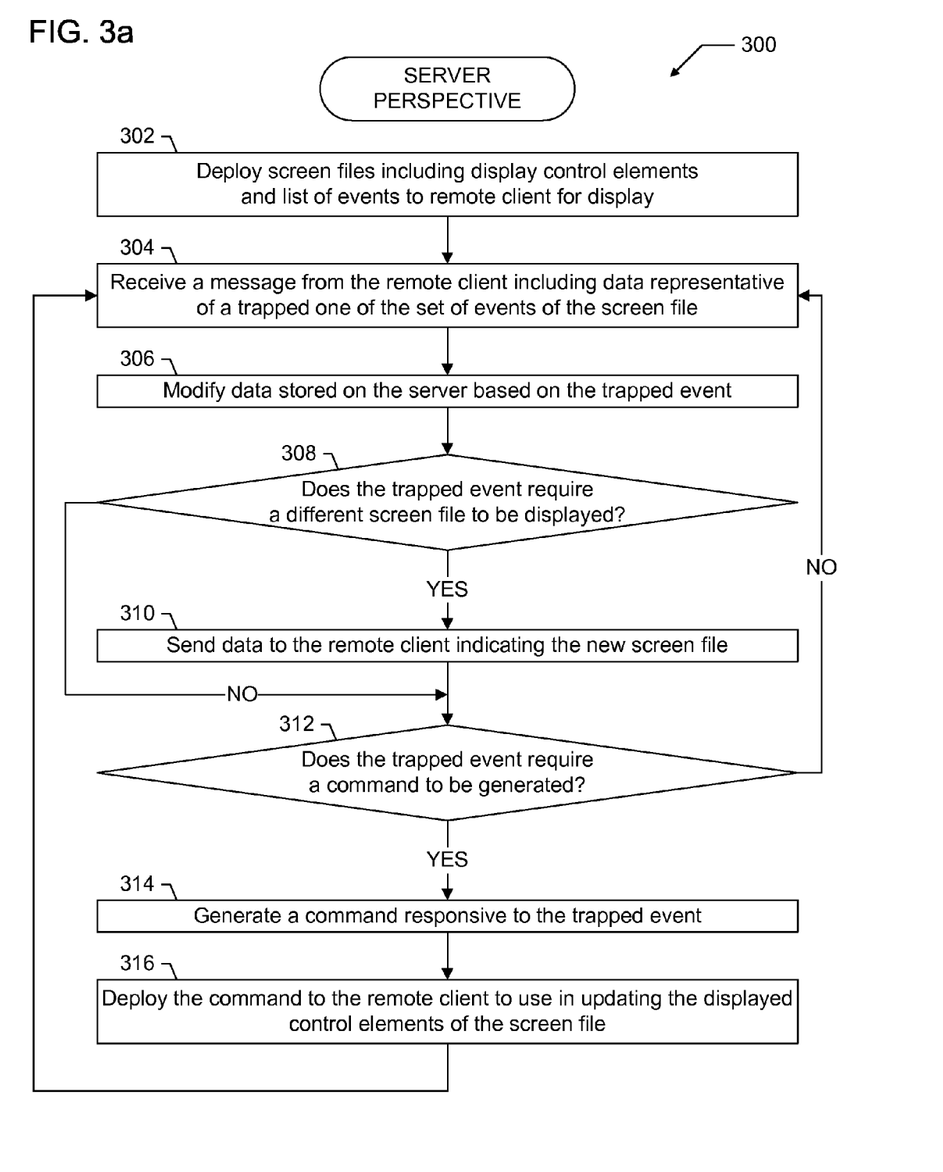
FIG. 3a is a flow chart of an example process for deploying and screen files to a remote client for display to a remote operator and for enabling the remote operator to browse and/or manipulate data stored at the server, illustrated from a server perspective.

FIG. 3a is a flow chart of an example process 300 for providing screen files to a remote client for display to a remote operator and for enabling the remote operator to browse and/or manipulate data stored on the server, illustrated from the perspective of the server. Although the example process 300 for generating and sending a plurality of screen files is described with reference to the flow chart illustrated in FIG. 3a, it should be appreciated that many other methods of generating and sending screen files are contemplated. For example, the order of certain of the blocks may be changed, and certain of the blocks described are optional.

The process 300 begins when the server (i.e., the host device 100) deploys a plurality of screen files, wherein the screen files include display control elements and a list of events for trapping and sending by the remote client (block 302). The plurality of display control elements may be any suitable set of display control elements including a plurality of menu items, a plurality of images, a block of text, a plurality of hyperlinks, or any other suitable image data. Moreover, the display control elements may be a representation of data stored in the storage device 118 of the host device 100, such as a representation of insurance data stored in a database of insurance information.

The display control elements are preferably a stored as a set of instructions to the display control which do not contain display-specific information such as color, absolute position, or font. The display control elements may be represented by markup language data, such as XML data, which is interpretable by a display control. For example, the display control elements may include a plurality of display control elements as well as the text displayed within each display control element, but may not include data about the specific aesthetic properties of the display control elements. Preferably, the display control elements are stored such that substantially less data is usable to construct a display than if color data were stored about each pixel to be displayed in a display control. The host device 100 may generate the display control elements so as to rely on the display control of a remote client to determine a plurality of characteristics about the display of each display control element, such as size, shape, color, font, relative position in the display control, and any other similar characteristics.

The disclosed server is then configured to wait until it receives a message from the remote client including data representative of a trapped event of the set of events of the screen file (block 304). For example, the server may wait until a user at a remote client browses a plurality of display control elements such as list elements and generates a trappable event based on the display control elements, such as a send data event. Upon receiving such a message from the remote client, the host device may modify data stored on the server based on the trapped event (block 306). For example, if the operator inputs a send data event, the host device may store the sent data in the database of the host device 100.

It should be appreciated that by sending commands, the disclosed system enables a minimal amount of data to be sent while an operator at a remote client interacts with a screen file. That is, upon deployment of the screen files, the plurality of display control elements contained therein enable robust interaction and only require modification by server-generated commands.

Figure 3B:
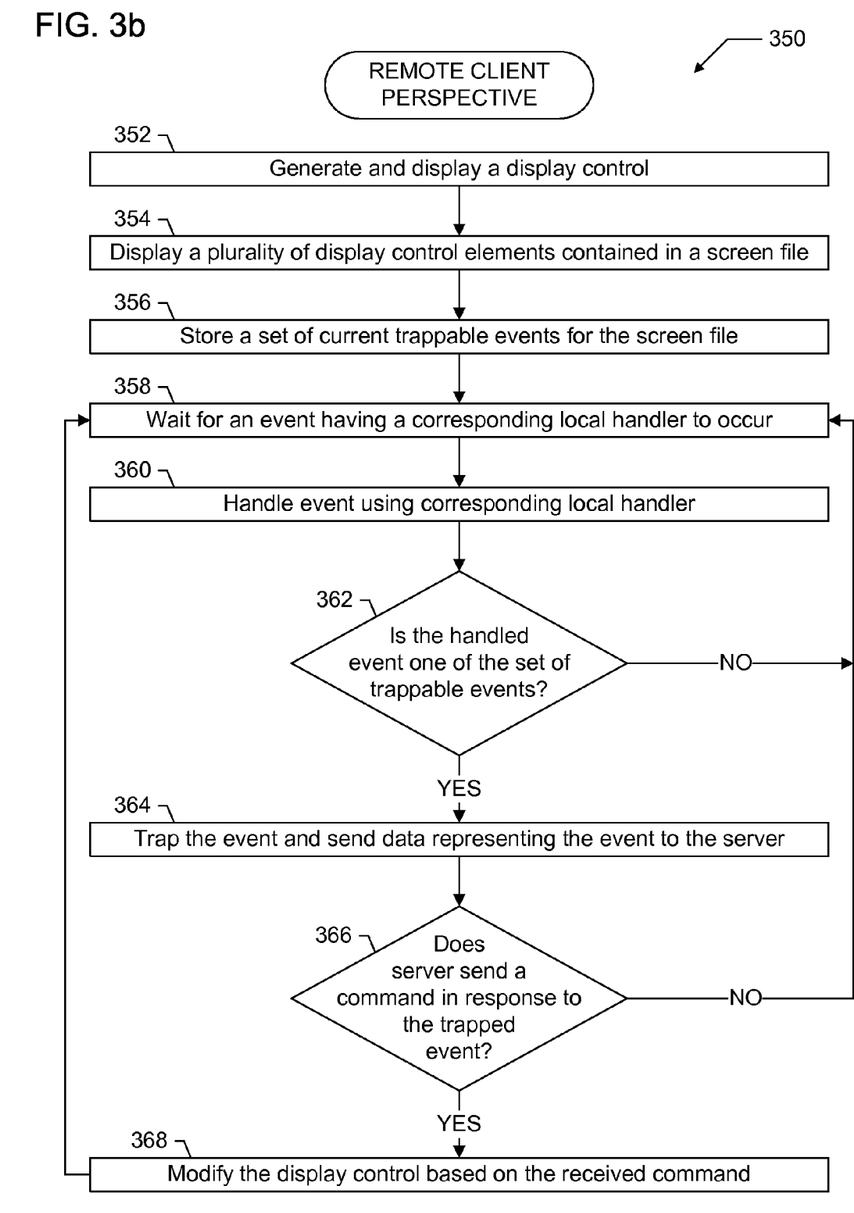
FIG. 3b is a flow chart of an example process for deploying screen files to a remote client for display to a remote operator and enabling the remote operator to browse and/or manipulate data stored at the server, illustrated from a remote client perspective.

FIG. 3b is a flow chart of an example process 350 for providing screen files to a remote client for display to a remote operator and for enabling the remote operator to browse and/or manipulate data contained in the screen file and displayed in the display control, and the data stored at the server, illustrated from the perspective of the remote client 150. Although the example process 350 for generating and sending a plurality of screen files is described with reference to the flow chart illustrated in FIG. 3b, it should be appreciated that many other methods of generating and sending screen files are contemplated. For example, the order of certain of the blocks may be changed, and certain of the blocks described are optional.

From the perspective of the remote client 150, the remote client first generates and displays a display control such as display control 154 (block 352). The display control may be implemented by client-side software running on the remote client 150. The client-side software may be relatively simple and may have a relatively low set of hardware requirements for proper execution.

For a session initiated by the operator, the display control preferably displays a window or other suitable representation on the display device 152 such that the operator can easily see the display control 154 and any display control elements displayed therein. The display control may be configured to receive data representing a plurality of display control elements and to determine, based on the received data, where to display the display control elements within the display control and also to determine the aesthetic appearance of the display control elements. For example, the display control may determine a color scheme, a size, an absolute position, and a font for a display control element representing a menu item. Moreover, the display control may be configured to enable an operator to manipulate data displayed by and stored as a plurality of display control elements, update the display control elements in corresponding screen files, and illustrated the updated display control elements to the operator.

The remote client may display the stored display control elements in the display control 154 indicated by an appropriate screen file (block 354). For example, if the operator accesses a screen file which provides a login screen, the display control may display a user-name data entry display control element and a masked password display control element. The display control elements may be configured to provide the operator at the remote client 150 with a robust representation of an interface to application software running on the server. The display control displays the plurality of display control elements indicated by the appropriate screen file, such as by determining an absolute position, color, shape, and appearance based on the relatively sparse amount of data contained within the screen file.

The display control may also analyze the current screen file and may store a set of currently trappable events for that screen file (block 356). For example, a first screen file may include a different set of trappable events than a second screen file, based on the robustness of functionality of the screen files. It should be appreciated that by storing the plurality of trappable events on a screen file by screen file basis, the disclosed system enables customized event handling and enables the network connection to be utilized as efficiently as possible.

Upon displaying the image data, the remote client 150 may wait for an event to occur (block 358). This event may be any event having a sufficient local handler, even if a corresponding trappable event is not included in the then-displayed screen file (block 358). It should be appreciated that events may occur based on any suitable operator input, such as input made using a keyboard, mouse, or other suitable input device. It should be further appreciated that software running on the remote client (such as an operating system or client-side application software) may include handlers for a plurality of events which are not included in the set of events of the screen file. That is, the set of events in the screen file may be a subset of the events which the remote client is configured to handle.

For a received event, the remote client handles the event locally (block 360). For example, the remote client 150 may handle a mouse input event by causing a cursor displayed on the display control to more. Moreover, the remote client 150 may determine whether the handled event is one of the set of trappable events stored in association with the screen file (block 362). If the event is not one of the trappable events (block 362), the remote client 150 may perform no further action and may wait to receive another event (block 358). If the received data indicates an occurrence of a trappable event included in the screen file (block 362), the remote terminal may trap the event and may send data indicative of the event to the host device 100 (block 364).

It should be appreciated that certain of the screen files may be configured to handle a relatively large set of events (such as mouse events, keyboard events, and other events), yet may trap and send only a small subset of events. Thus, certain screen files may enable an operator to interact a great deal with a screen shot based on relatively complex display control elements, and may only send a relatively few quantity of the handled events to the server as trapped events.

For example, a screen file which displays display control elements including a login screen may enable the operator to modify a user name and password, may mask the data appropriately as it is displayed, and may enable the operator to change the data without trapping any events and sending them to the server. When the operator selects a "send" display control element, such a screen file may trap the event and may send appropriate data, including the entered data, to the server. A different screen file may enable similar interaction with a plurality of data fields, such as a plurality of fields for entering information about a new purchaser of insurance. The remote client 150 may handle events such as keystroke events for entering data, mouse events for navigating the data fields, and auto-backup events for caching the entered data in a memory of the remote client 150. The screen file may be configured only to trap and send data indicative of a "submit" event, which indicates that the operator has clicked or selected a submit button. Upon an occurrence of such an event, the system may send data indicative of the entered data to the server such that application software of the server can update a central database of insurance customer information. Alternatively, the screen file may include a radio button-select or checkbox-select trappable event. Upon the selection of a radio button or the checking of a checkbox, the disclosed system may send data indicating such a selection to the host device 100 for handling. It should be appreciated that screen files such as screen file 200 may enable an operator to define a custom set of events for trapping and handling by the server.

After sending the appropriate data representative of the trapped event to the server, the remote client 150 determines whether the server sends a command in response to the trapped event (block 366). A determination of whether the server responds with an additional command may be made in a number of ways. For example, the remote client may determine whether a command is an appropriate response based on the type of event trapped. The remote client may alternatively make such a determination by waiting for a designated amount of time for a response from the server. The server may be configured to respond to each message sent by the remote client 150 by sending a command, and the response may contain an indication whether an additional command is forthcoming. The disclosed system may also utilize any combination of the above mechanisms.

If the server does not send a command, the remote terminal may again waits for another event (block 358).

If the disclosed server does respond to the trapped event by sending an appropriate command (block 366), the remote client analyzes the command and modifies the display control according to the contents of the command. For example, the remote client may determine based on a received command that one or more hidden display control element is to be displayed or vice versa. Alternatively, the command may include new or additional content data for display by one of the display control elements of the display control.

It should be appreciated that the more robust the set of display control event which is stored in the screen files, the less frequently the server must send a command. For example, if a screen file enables an operator to access a plurality of screens to input new data about an insurance customer, the remote client 150 may maintain a representation of the database on the server 100, such that commands need not be generated for each update to the data stored on the server. It should be further appreciated that receipt of new commands may represent that the screen file has never previously been accessed by a particular remote client. If this is the case, the remote client may be configured to receive the command as a prerequisite to performing a desired interface with the application software of the server.

Alternatively, instead of determining that a command is to be sent by the server, the disclosed screen files may include data indicating that for a given input, another screen file stored on the remote client should be accessed. For example, if a first screen file displays control elements to enable an operator to enter personal information about a new client and a second screen file displays control elements to enable the operator to enter automobile information about the new client, the first screen file may, upon handling an event that the operator is finished entering personal data, cause the display control to execute the second screen file. In this situation, a last screen file may cause the data entered in a plurality of fields of a plurality of previous screen files to be sent to the server for storage in a central database substantially simultaneously.

The disclosed system may be configured to cache screen files on the remote client 150 upon receipt of each screen file. It should be appreciated that if the remote client 150 caches screen files, the host device 100 may determine prior to sending a generated screen file whether the generated screen file is already present on the remote client 150. Thus, the disclosed system potentially preserves network and computing resources even further by preventing duplicate data from being sent to the remote client 150 whenever possible.

If the remote client 150 caches a plurality of screen files, the host device 100 may re-send a cached screen file in certain circumstances. For example, the host device 100 may generate screen files which include version information stored in association with the screen file. For each generated screen file, the host device 100 may first determine whether the screen file is cached at the remote client 150 and, if so, may second analyze the version of the cached screen file. If the cached screen file is associated with an outdated version, the host device 100 may send a screen file with the current version to the remote client 150, which overwrites the cached screen file.

The disclosed system may implement a version control system based on which data of a screen file has been modified. For example, a screen file may be associated with version information including a main version, an event version, and an international version. The system may update the main version of a screen file if the display control elements of the screen file are modified. The system may update the event version of a screen file if the event details associated with the screen files are modified. The system may update the international version of the screen file if the screen file represents a copy of an existing screen file in a different language.

Upon receiving data indicative of a trapped event, the host device 100 may compare the main version of the cached screen which generated the trapped event to the main version of the corresponding screen file of the host device, the event version of the cached screen file to the event version of the corresponding screen file of the host device, and the international version of the cached screen file to the international version of the corresponding screen file of the host device. The system may determine based on these comparisons that it is appropriate to send a different version of the screen file to the remote client 150 to replace the cached screen file. For example, the system may send a new screen file to the remote client 150 if any of the version information is out of date. Alternatively, the system may determine that a new version need not be sent if only certain of the versions are out of date, such as if only the international version is out of date.

The disclosed system may store a plurality of screen files which represent a total set of screen files needed to provide remote access to application software running on the host device 100 prior to enabling such remote access. For example, the host device 100 may store a plurality of screen files, wherein each screen file includes a plurality of display control elements, which enable a remote client 150 to display interfaces representing the entire functionality of the application software. In this example, upon connecting to the host device 100 for the first time, a remote client 150 may receive data indicative of each of the screen files needed to remotely access the application software. Thus, for subsequent connections to remote client 150, the host device may need only to compare version information of the plurality of cached screen files to the current version information of the screen files stored on the host device 100.

Alternatively, the disclosed system may enable a remote client 150 which has not previously connected to the host device 100 to access the application software of the host device 100 by uploading screen file information as needed. For example, the host device 100 may send a first screen file upon connection with a remote client 150 representing a login screen. If the operator provides appropriate login information, the host device 100 may thereafter send a screen file which enables the operator the operator at the remote client 150 to access the primary functionality of the application software. The remote client 150 may cache the screen files as they are received, but it should be appreciated that it is possible, depending on the functionality used by the operator, that the host device 100 never sends all the screen files associated with given application software to one or more remote clients 150.

A combination of the two implementations is also contemplated, wherein the host device 100 sends a minimum set of screen files upon a first connection, and supplements the screen files as an operator explores the relatively less frequently used functionality of the application software.

Screen files may be created by application software developers at the time of developing application software. For example, developers may create screen files in parallel with the development of a user interface of the application software, such that as the interface evolves, so too do the accompanying screen files. Alternatively, screen files may be created by server administrators to provide access to existing application software. Certain application software may be configured to analyze existing software and to create a plurality of screen files based on the existing application software. It should be appreciated that regardless of the mechanism for creating screen files as disclosed herein, the screen files include display control elements sufficient to enable robust access to server-side application software and also include a minimal set of events which must be handled to enable such robust access.

The system disclosed herein thus enables a server such as host device 100 to operate in a perpetual or substantially perpetual loop to continually listen for data indicative of trapped events at a remote client 150 based on a plurality of screen files which provide remote access to application software of the host device 100. Based on the trapped events, the host device 100 generates commands to be sent to the remote client 150. The host device 100 may also compare version information of a screen file stored on the host device 100 with the screen file stored on the remote client 150. It should be appreciated that by minimizing the quantity of events which are trapped for any given screen file, the disclosed system minimizes network traffic between the host device 100 and the remote client 150. Thus, despite providing relatively small binary representations of screen files and relatively smaller commands, the host device 100 enables a remote operator to interact with the host device 100 in a substantially transparent way, such that only necessary operations are received by the host device and the bulk of the aesthetic operations, such as browsing operations, are handled by the display control of the remote client 150. Moreover, by providing image data in the form of display control elements (as opposed, e.g., to image files such as bitmap files), the disclosed system minimizes the size of screen files transferred from the server to the remote client 150. By enabling the list of trapped events to be modified dynamically on a screen file by screen file basis, the disclosed system also reduces the hardware usage by the remote client for screen files which are less interactive, such as screen files containing non-modifiable database content data, wherein the server continually generates updated screen files to provide the illusion that the operator at the remote client 150 is operating the software running on the server while at the same time minimizing the quantity of events which must be handled and the amount of image data which must be sent to the remote client 150.

In summary, a system and methods for generating a plurality of screen files which provide remote access to application software running on a server have been provided. It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of remotely displaying data, the method comprising:
   storing a database of content data;
   storing a first screen file, the first screen file including a first display control element and a first set of trappable events including at least a first trappable event customized to the first display control element;
   storing a second screen file, the second screen file including a second display control element and a second set of trappable events including at least a second trappable event customized to the second display control element, and the second set of trappable events is different from the first set of trappable events;

deploying the first screen file to a remote device configured to display the first control element and handle at least two events for the first screen file, the at least two events including at least the first trappable event and a third locally handled event;

receiving data indicative of a first trapped event corresponding to the first trappable event;

modifying the database of content data based on the data indicative of the first trapped event;

generating a command in response to the data indicative of the first trapped event, the command being sendable to alter the first display control element based on the first trapped event;

sending the command for execution by the remote device; and deploying the second screen file to the remote device configured to display the second control element and handle at least two events for the second screen file, the at least two events including at least the second trappable event and a fourth locally handled event.

2. The method of claim 1, wherein the first display control element includes a representation of a feature of an interface of a software application.

3. The method of claim 2, wherein the feature is one selected from the group consisting of a list, a data entry field, a radio button, a check box, and a submit data button.

4. The method of claim 2, wherein the software application is database access software.

5. The method of claim 1, wherein the first trappable event is a selection of the first display control element.

6. The method of claim 1, wherein the modified database content reflects data entered into the first display control element.

7. The method of claim 1, wherein the command is additionally sendable to reveal a previously hidden third display control element.

8. The method of claim 7, wherein revelation of the third display control element causes an activation of an inactive third trappable event.

9. The method of claim 1, wherein the first screen file has a file size of less than twenty kilobytes.

10. The method of claim 1, wherein the first screen file has a file size of less than ten kilobytes.

11. The method of claim 1, wherein the first screen file has a file size of less than two kilobytes.

12. The method of claim 1, wherein the first screen file and the second screen file display different representations of a user interface of application software stored on a server.

13. The method of claim 12, wherein the application software is insurance database access software.

14. The method of claim 1, which is configured to be implemented using a data network.

15. The method of claim 14, wherein the data network is an internet.

16. A screen file deployment apparatus, the screen file deployment apparatus comprising:

at least one processor;
at least one memory device; and
at least one network interface device;
wherein the at least one processor is programmed to operate with the at least one memory device and the at least one network interface device to:
store a database of content data;
store a first screen file, the first screen file including a first display control element and a first set of trappable events including at least a first trappable event customized to the first display control element;

store a second screen file, the second screen file including a second display control element and a second set of trappable events including at least a second trappable event customized to the second display control element, and the second set of trappable events is different from the first set of tappable events;

deploy the first screen file to a remote device configured to display the first control element and handle at least two events for the first screen file, the at least two events including at least the first trappable event and third locally handled event;

receive data indicative of a first trapped event corresponding to the first trappable event;

modify the database of content data based on the data indicative of the first trapped event;

generate a command in response to the data indicative of the first trapped event, the command being sendable to alter the first display control element based on the first trapped event;

send the command for execution by the remote device; and deploy the second screen file to the remote device configured to display the second control element and handle at least two events for the second screen file, the at least two events including at least the second trappable event and a fourth locally handled event.

17. The screen file deployment apparatus of claim 16, wherein the first display control element includes a representation of a feature of an interface of a software application executable by the processor.

18. The screen file deployment apparatus of claim 17, wherein the feature is one selected from the group consisting of a list, a data entry field, a radio button, a check box, and a submit data button.

19. The screen file deployment apparatus of claim 16, wherein the command is additionally sendable to reveal a previously hidden third display control element.

20. The screen file deployment apparatus of claim 19, wherein revelation of the third display control element causes an activation of an inactive third trappable event.

21. The screen file deployment apparatus of claim 16, wherein the first screen file has a file size on the at least one memory device of less than twenty kilobytes.

22. The screen file deployment apparatus of claim 16, wherein the first screen file has a file size on the at least one memory device of less than two kilobytes.

23. The screen file deployment apparatus of claim 16, wherein the first screen file and the second screen file display different representations of a user interface of application software stored on a server.

24. A non-transitory machine readable memory storing instructions structured to cause an apparatus to:

store a database of content data;
store a first screen file, the first screen file including a first display control element and a first set of trappable events including at least a first trappable event customized to the first display control element;
store a second screen file, the second screen file including a second display control element and a second set of trappable events including at least a second trappable event customized to the second display control element, and the second set of trappable events is different from the first set of trappable events;
deploy the first screen file to a remote device configured to display the first control element and handle at least two events for the first screen file, the at least two events including at least the first trappable event and a third locally handled event;
receive data indicative of a first trapped event corresponding to the first trappable event;
modify the database of content data based on the data indicative of the first trapped event;
generate a command in response to the data indicative of the first trapped event, the command being sendable to alter the first display control element based on the first trapped event;
send the command for execution by the remote device; and
deploy the second screen file to the remote device configured to display the second control element and handle at least two events for the second screen file, the at least two events including at least the second trappable event and a fourth locally handled event.

25. The non-transitory machine readable memory of claim 24, wherein the first display control element includes a representation of a feature of an interface of a software application executable by the processor.

26. The non-transitory machine readable memory of claim 25, wherein the feature is one selected from the group consisting of a list, a data entry field, a radio button, a check box, and a submit data button.

27. The non-transitory machine readable memory of claim 24, wherein the command is additionally sendable to reveal a previously hidden third display control element.

28. The non-transitory machine readable memory of claim 27, wherein revelation of the third display control element causes an activation of an inactive third trappable event.

29. The non-transitory machine readable memory of claim 24, wherein the first screen file has a file size on the at least one memory device of less than twenty kilobytes.

30. The non-transitory machine readable memory of claim 24, wherein the first screen file has a file size on the at least one memory device of less than two kilobytes.

31. The non-transitory machine readable memory of claim 24, wherein the first screen file and the second screen file display different representations of a user interface of application software stored on a server.

* * * * *